(12) United States Patent
Krause et al.

(10) Patent No.: US 7,380,558 B2
(45) Date of Patent: Jun. 3, 2008

(54) STATIONARY VEHICLE CLEANING SYSTEM

(75) Inventors: David Krause, DePere, WI (US); Forrest Burton, Chisago City, MN (US); Joseph Grzelak, Green Bay, WI (US); Russell W. Garniss, Green Bay, WI (US); Kenneth Smith, Green Bay, WI (US); David Stank, Sheboygan, WI (US)

(73) Assignee: TransClean, Inc., De Pere, WI (US)

( * ) Notice: Subject to any disclaimer, the term of this patent is extended or adjusted under 35 U.S.C. 154(b) by 637 days.

(21) Appl. No.: 10/449,453

(22) Filed: May 28, 2003

(65) Prior Publication Data

US 2004/0238016 A1    Dec. 2, 2004

(51) Int. Cl.
*B08B 3/02* (2006.01)

(52) U.S. Cl. .................... 134/56 R; 134/123

(58) Field of Classification Search ............... 134/123, 134/56 R, 57 R
See application file for complete search history.

(56) References Cited

U.S. PATENT DOCUMENTS

| | | | | |
|---|---|---|---|---|
| 2,419,397 A | * | 4/1947 | Frohoff et al. | 134/123 |
| 2,788,009 A | * | 4/1957 | Lones | 134/102.2 |
| 2,881,459 A | * | 4/1959 | Emanuel | 15/53.3 |
| 2,900,950 A | | 7/1959 | Peeps | |
| 2,983,937 A | * | 5/1961 | Tytler et al. | 15/53.3 |
| 3,037,224 A | * | 6/1962 | Webster | 15/53.2 |
| 3,060,473 A | * | 10/1962 | Vani | 15/53.3 |
| 3,134,117 A | * | 5/1964 | Frank et al. | 15/53.3 |
| 3,255,037 A | | 6/1966 | Knight et al. | |
| 3,410,284 A | | 11/1968 | Burger | |
| 3,445,286 A | * | 5/1969 | Knight et al. | 134/32 |
| 3,451,094 A | | 6/1969 | Kywi | |
| 3,459,203 A | | 8/1969 | Pritchard | |
| 3,510,898 A | * | 5/1970 | Odachi et al. | 15/4 |
| 3,533,422 A | * | 10/1970 | Constantin | 134/45 |
| 3,573,862 A | | 4/1971 | Brown | |
| 3,645,282 A | | 2/1972 | Kurronen | |
| 3,795,929 A | | 3/1974 | Thompson | |

(Continued)

FOREIGN PATENT DOCUMENTS

DE    39 29 561    *    8/1990

(Continued)

OTHER PUBLICATIONS

European Patent Office 0 283 446 Sep. 1998.*

*Primary Examiner*—Frankie L. Stinson
(74) *Attorney, Agent, or Firm*—Nancy R. Gamburd; Gamburd Law Group LLC

(57) ABSTRACT

A vehicle cleaning system in accordance to one embodiment of the present invention includes a horizontally movable carriage suspended above the vehicle, and a vertically moveably support mechanism suspended from said carriage. The support mechanism includes a pair of horizontal spray bars for dispensing liquids that are attached at one end to a dual-pivotal connection defined by the support mechanisms, while the spray bars other end is magnetically aligned with the other end of the other spray bar. The system also includes a the profile of a vehicle positioned between said columns and a controller to communicate with the plurality of sensors control the movement of the carriage and the support mechanisms in response to the profiles of the vehicle.

20 Claims, 19 Drawing Sheets

U.S. PATENT DOCUMENTS

| | | | | |
|---|---|---|---|---|
| 3,823,356 | A * | 7/1974 | Paavola et al. | 318/39 |
| 4,028,766 | A * | 6/1977 | Bivens | 15/53.3 |
| 4,383,334 | A | 5/1983 | Scraggs et al. | |
| 4,383,344 | A * | 5/1983 | Scraggs et al. | 15/53.2 |
| 4,450,600 | A * | 5/1984 | Shelstad | 15/53.2 |
| 4,562,848 | A | 1/1986 | Messing et al. | |
| 4,587,688 | A | 5/1986 | Gougoulas | |
| 4,679,578 | A | 7/1987 | Miller | |
| 4,718,439 | A | 1/1988 | Gorra et al. | |
| 4,719,932 | A * | 1/1988 | Burton | 134/57 R |
| 4,726,388 | A | 2/1988 | Swinehart | |
| 4,798,217 | A | 1/1989 | Hanna | |
| 4,920,997 | A * | 5/1990 | Vetter et al. | 134/57 R |
| 4,946,513 | A * | 8/1990 | Del Prato et al. | 134/18 |
| 4,981,523 | A | 1/1991 | Larson et al. | |
| 4,988,042 | A | 1/1991 | Del Prato et al. | |
| 5,016,662 | A * | 5/1991 | Crotts et al. | 134/45 |
| 5,020,556 | A * | 6/1991 | Lamminen et al. | 134/112 |
| 5,040,485 | A | 8/1991 | Bailey et al. | |
| 5,187,881 | A | 2/1993 | McElroy | |
| 5,320,121 | A * | 6/1994 | Alexanian | 134/123 |
| 5,352,297 | A * | 10/1994 | Peters | 134/15 |
| 5,413,128 | A * | 5/1995 | Butts | 134/56 R |
| 5,518,553 | A * | 5/1996 | Moulder | 134/22.18 |
| 5,755,043 | A | 5/1998 | Belanger et al. | |
| 5,806,542 | A * | 9/1998 | Hoffer et al. | 134/57 R |
| 5,930,859 | A | 8/1999 | Ennis | |
| 6,134,735 | A | 10/2000 | Zamensky et al. | |
| 6,202,244 | B1 | 3/2001 | Anderson | |
| 6,277,207 | B1 * | 8/2001 | Gauthier | 134/18 |
| 6,325,863 | B1 | 12/2001 | Zamensky et al. | |
| 6,372,053 | B1 * | 4/2002 | Belanger et al. | 134/34 |
| 6,595,221 | B2 * | 7/2003 | Jones et al. | 134/57 R |
| 6,679,275 | B2 * | 1/2004 | Heinze et al. | 134/56 R |
| 7,100,621 | B2 * | 9/2006 | Johnson | 134/123 |

FOREIGN PATENT DOCUMENTS

| | | | |
|---|---|---|---|
| DE | 195 12 302 | * | 10/1996 |
| DE | 44 17 864 | * | 11/1996 |
| DE | 195 42 855 | * | 5/1997 |
| GB | 2 029 344 | * | 3/1980 |
| JP | 2-225160 | * | 9/1990 |
| JP | 2-262450 | * | 10/1990 |
| JP | 4-100761 | * | 4/1992 |
| JP | 9-188228 | * | 7/1997 |
| JP | 10-35432 | * | 2/1998 |
| SU | 1772019 | * | 12/1989 |

* cited by examiner

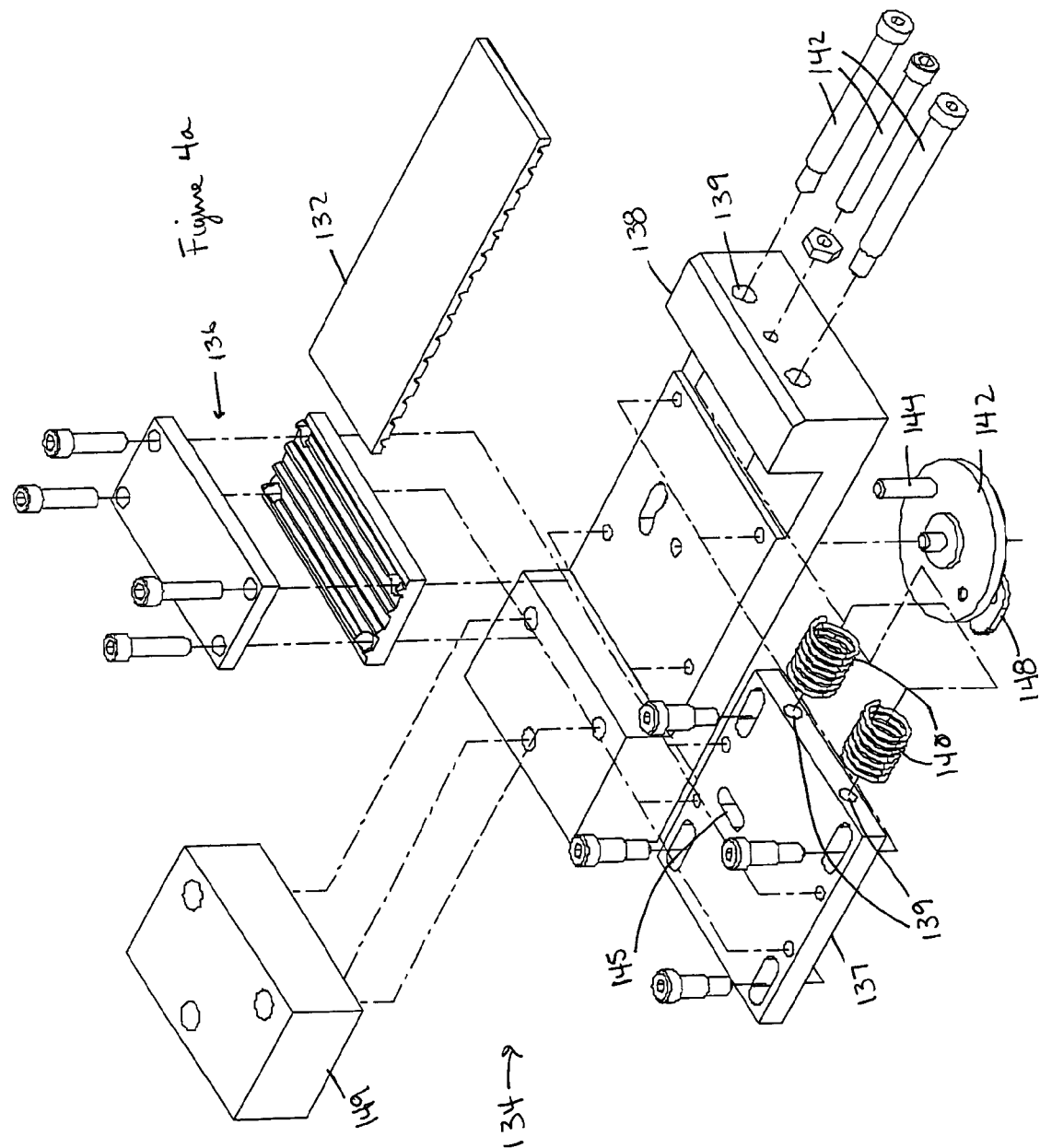

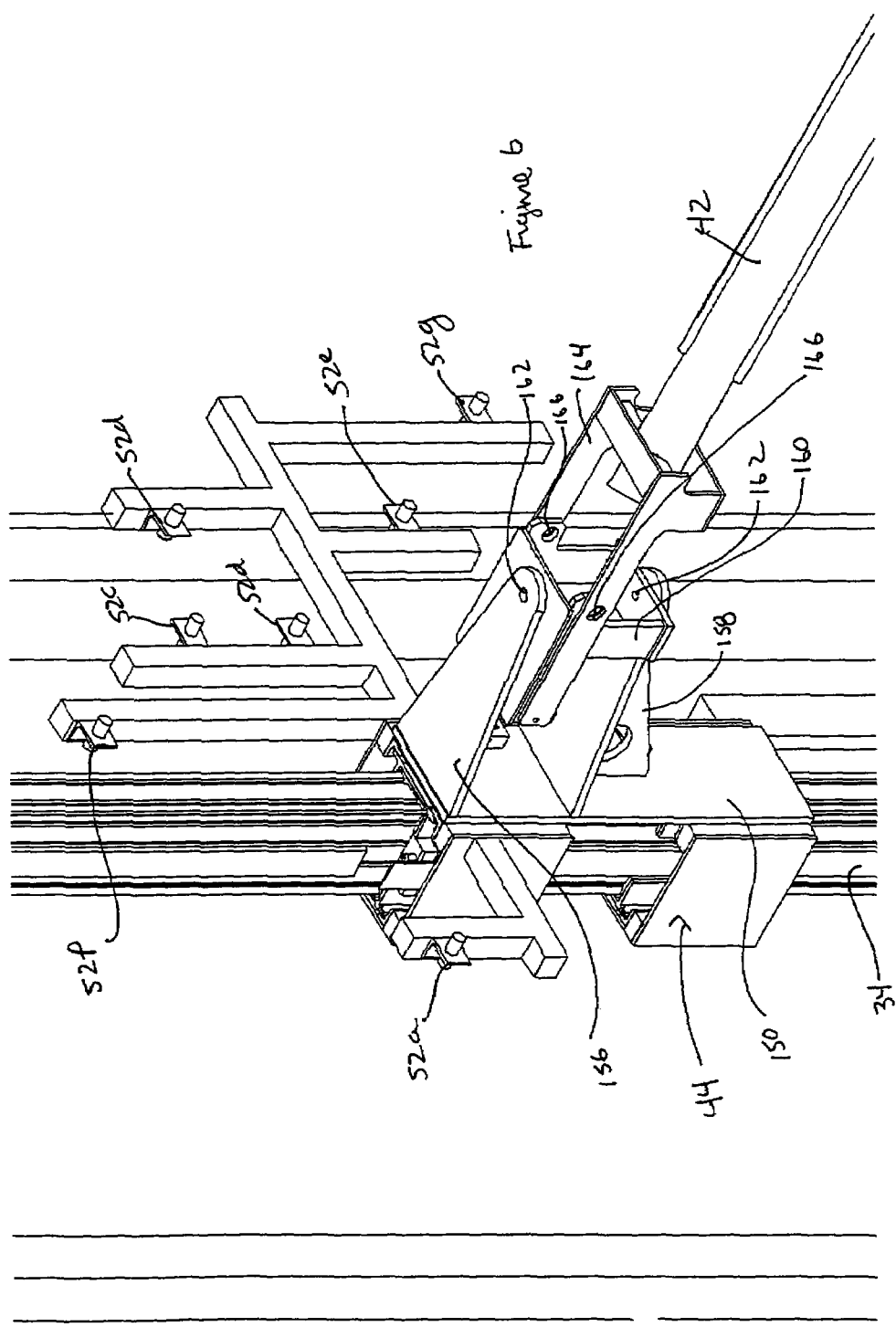

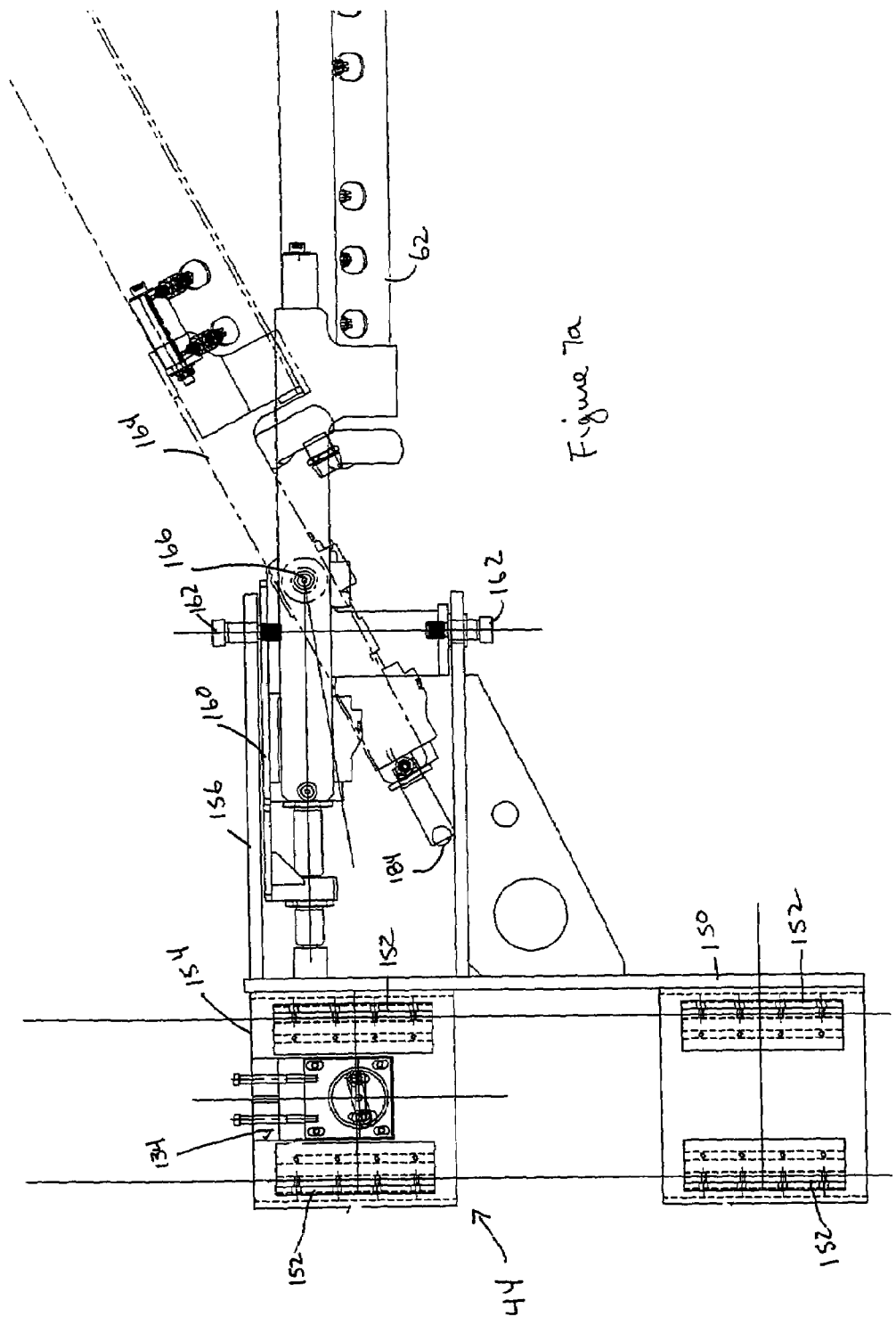

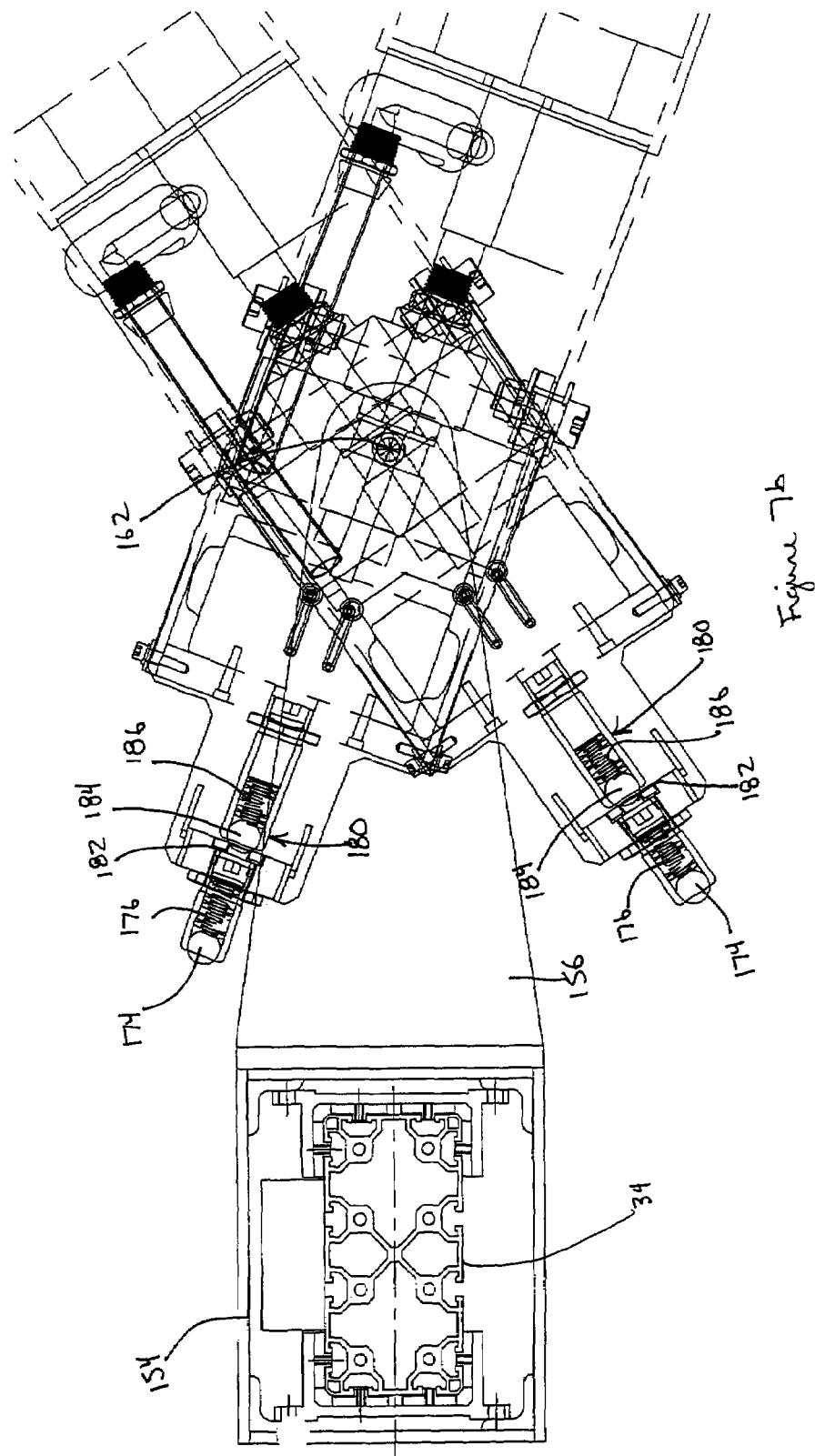

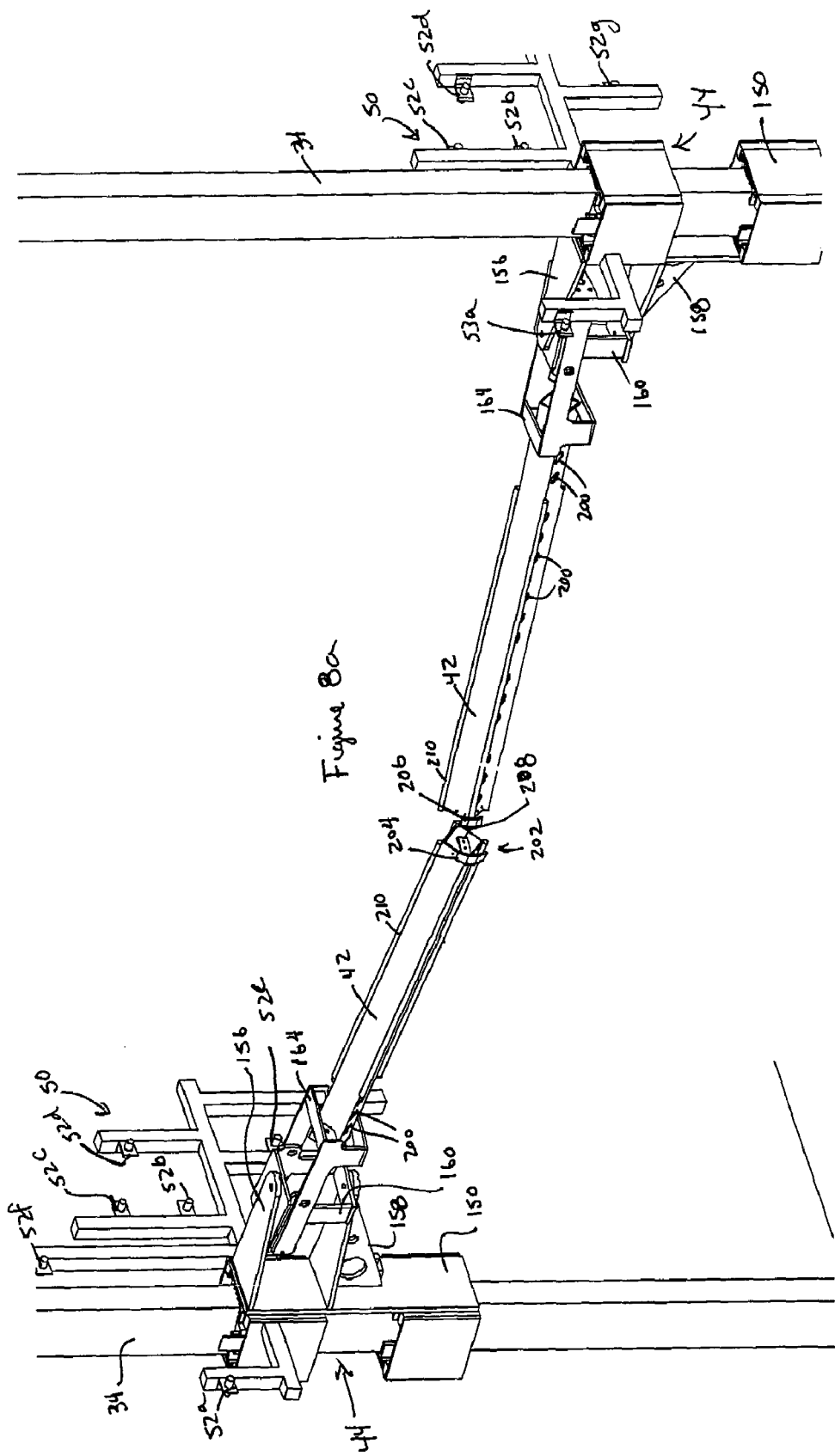

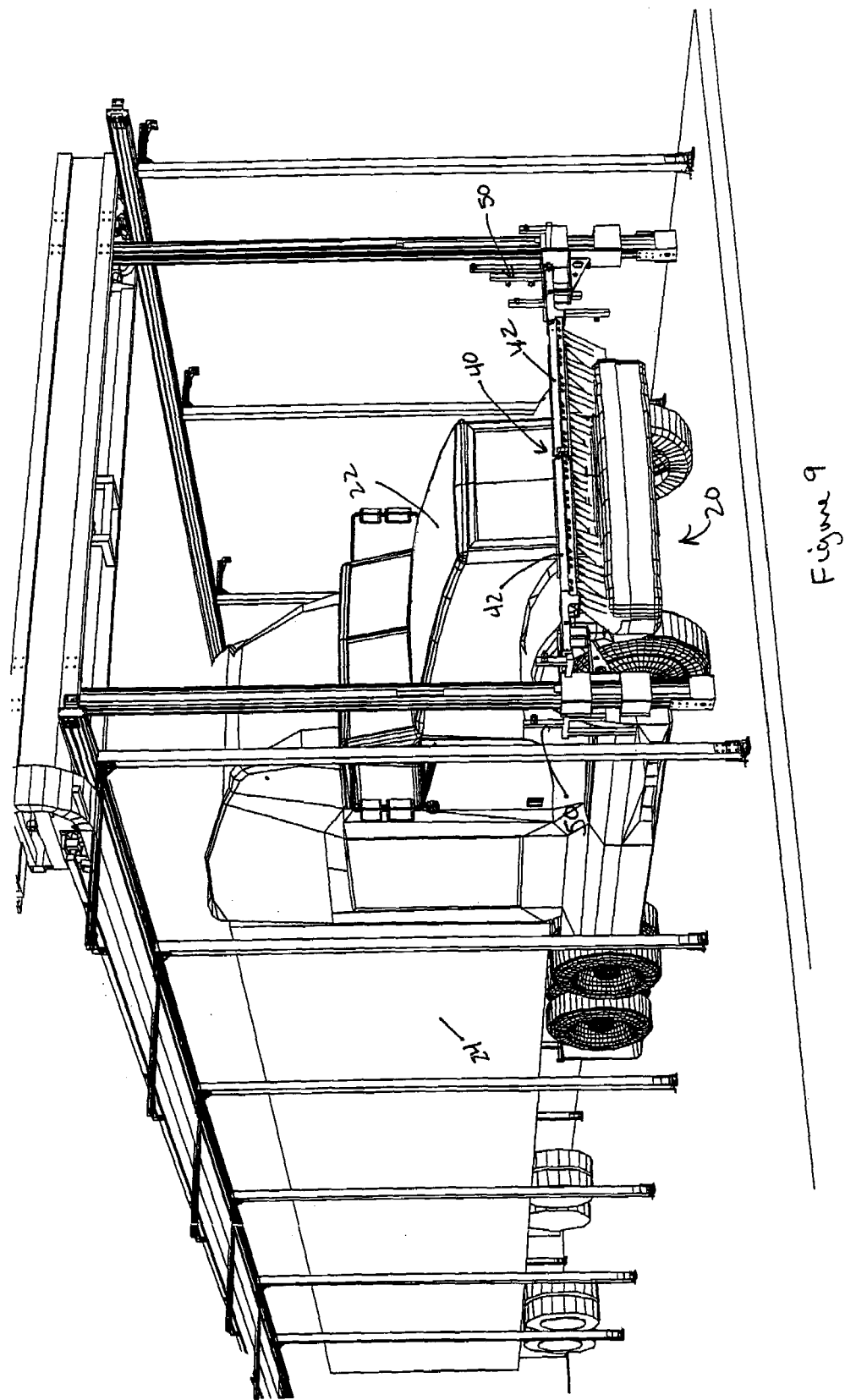

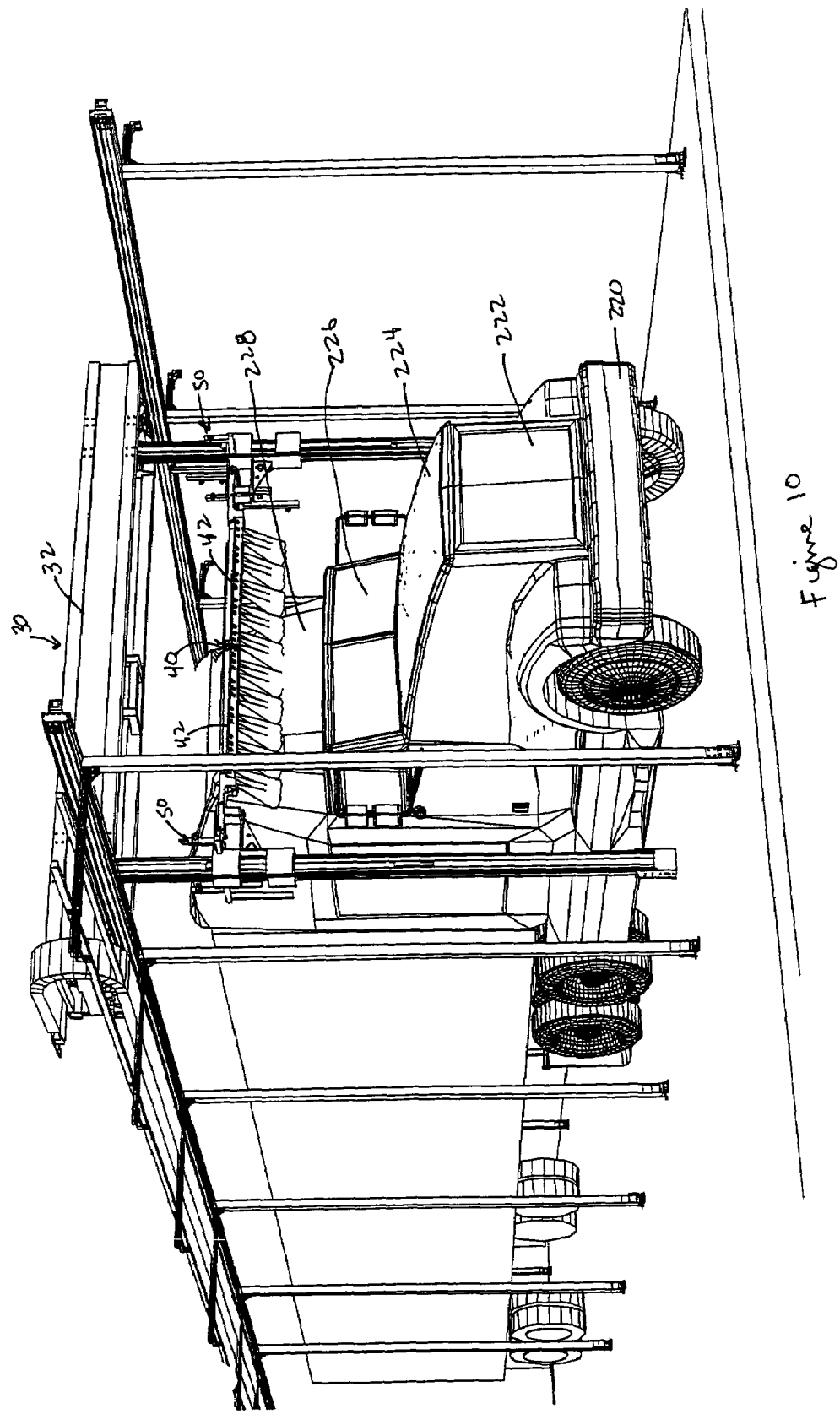

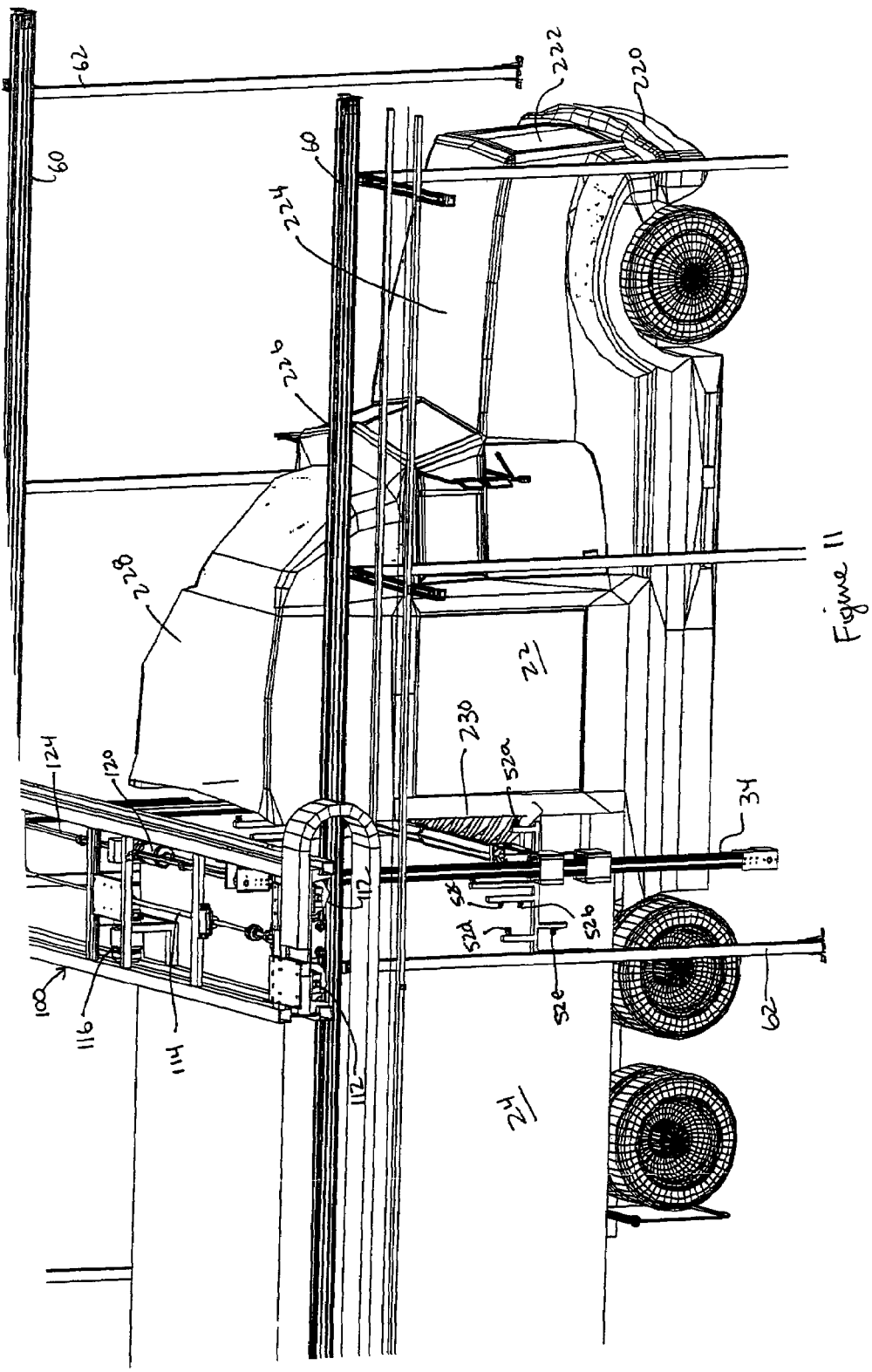

STATIONARY VEHICLE CLEANING SYSTEM

FIELD OF THE INVENTION

The present invention relates to vehicle cleaning apparatuses and more particularly to a vehicle cleaning system that incorporates vehicle profiling to adequately clean the surfaces of any type of vehicle.

BACKGROUND OF THE INVENTION

Vehicle cleaning systems are well known and include both stationary and moving cleaning systems. In a typical stationary vehicle cleaning system the vehicle remains stationary, and a single cleaning station is equipped with cleaning liquids which are sprayed onto and washed off a vehicle by a single cleaning apparatus. In a typical moving cleaning system, the vehicle is pulled or is diven through different cleaning stations to achieve the same results as the stationary cleaning systems.

Examples of various stationary vehicle cleaning systems include: U.S. Pat. Nos. 6,134,735 and 6,325,863 to Zamensky et al., which are directed to having a plurality of rotating dispensing wands attached to a rotating arm that moves around a stationary vehicle. To determine the end of the vehicle (such that the arm is able to rotate about the vehicle), sensors are positioned about the arm to "sense" or determine the front and rear end of the vehicle; U.S. Pat. No. 5,255,695 to Downey also discloses another rotatable and movable vehicle cleaning arm that includes sensors to determine the length of the vehicle; and U.S. Pat. No. 5,040,485 to Bailey et al. discloses a vehicle wash system that employs a dispensing arm suspended from a linear trolley that incorporates an arm that moves along the length of the vehicle and rotates around the vehicle to wash all surfaces of the vehicle.

These aforementioned systems are equipped to handle both large and small vehicles. In order to accommodate for all types of vehicles, these systems maintain the spray arms at a predetermined maximum distance away from the center of the cleaning area or a safe distance away from where the surface of the largest vehicle would appear. Unfortunately, the cleaning effect is dramatically reduced when a smaller vehicle enters the system, as the smaller vehicle is cleaned by the liquid spray at a reduced pressure (being that the further away the surface of the vehicle is from the dispensing nozzles, the lower the pressure of the liquid is when it actually makes contact with the vehicle).

It is thus an object of the present invention to provide a stationary wash system that provides a more thorough cleaning of a vehicle regardless of the vehicle's size, especially when the vehicle is a truck or includes a trailer. This objective may be accomplished by mapping the surface of the vehicle and moving and rotating the nozzles to maintain a specific distance away from the surface of the vehicle in accordance to the surface or profile of the vehicle.

It is, however, appreciated that the prior art includes the ability to provide a vehicle cleaning system that includes controlling a horizontal spray bar in accordance to the surface of a vehicle in a movable wash system. U.S. Pat. No. 4,981,523 ('523 patent) to Larson et al. discloses a cleaning system that includes a horizontal spray arm that moves horizontally and vertically to closely follow a vehicle's profile as the vehicle is pulled through the vehicle wash system. The spray arm is mounted on one side to a support housing and suspended over the entire vehicle. The mounting of the spray arm to the support housing includes a horizontal pivot connection, such that if the vehicle hits the spray arm, the spray arm will swing away from the vehicle. The cleaning system also includes a plurality of sensors positioned on the spray arm to contour the vehicle. As the vehicle is moved through the cleaning system, the sensors indicate to the controller to move the spray bar to follow the vehicle's profile. In all aspects of the '523 patent the vehicle is constantly moving as it is being pulled through the cleaning system. The controller mechanism, of the '523 patent, must thus be designed to control the movement of the spray arm not only in accordance with the profile of the vehicle, but also to compensate for the continuous movement of the vehicle through the cleaning system.

In addition, the prior art system includes a switch on top of the entrance to the system which, when activated, indicates to the system that a tall van or truck entered the system. When a truck enters the system, the spray bar is automatically raised 80 inches, such that the arm has enough height to clear the trailer. Consequently, the system provided in the '523 patent does not adequately profile and thus clean the front of the truck or tall van. The present system has the ability to adequately clean the front end of any vehicle, especially trucks, and at an optimal distance, which is lacking in the '523 patent.

There is thus a need to provide a stationary cleaning system that provides significant improved profiling of the front end of vehicles, especially trucks that include a grill, hood, windshield, and smoke stack. The improved stationary cleaning system should have the ability to clean between a cab and trailer; between trailers; and between a car and a trailer. Such an improved stationary cleaning system should also include unique safety features to protect the spray bars in case the vehicle moves during the washing cycle.

SUMMARY OF THE INVENTION

In accordance with the one embodiment of the present invention, there is provided a vehicle cleaning system that includes a horizontally moveable carriage mounted on over head tracks. Suspended from the carriage is a pair of columns diametrically positioned to define an area for which a vehicle may pass unobstructively between the columns. Attached to each column is a vertically moveable support mechanism. Each support mechanism includes a horizontal spray bar for dispensing liquids. Each spray bar includes one end attached at a dual-pivotal connection to one of the support mechanism and another end distal to the dual-pivotal connection that is aligned with and secured to the other distal end of the other spray bar. Each support mechanism further supports a plurality of sensors for detecting horizontal and vertical profiles of a vehicle positioned between the columns. The system further includes a controller in communication with the plurality of sensors and having a means to control the horizontal movement of the columns and the vertical movement of the support mechanisms in response to the profiles of the vehicle. As such the present invention provides the ability to adequately clean all surfaces of a vehicle especially when the vehicle includes an attached trailer.

The present invention may further include spray bars with ends that are magnetically secured to one another in order to keep the spray bars horizontally aligned in the same plane.

The support mechanisms may be defined as including a primary mount moveably secured to a column, a transition mount pivotally connected to the primary mount about a first pivot direction, and a secondary mount pivotally connected to the transition mount about a second pivot direction. Each support mechanism further includes separate means for resisting pivoting in the first and second pivot directions until the spray bar makes contact with an object sufficient enough to overcome the resisting means. The spray bars will become freely pivotally once the resisting means is overcome, such that if a vehicle makes contact with the spray bars, damage to the spray bars and/or vehicle is minimized.

The vertical movement of the support mechanisms is controlled by a single motor mechanism with separate pulley systems. Each pulley system has a timing belt with one end secured to a brake assembly (secured in the support mechanism) and another end secured to a counter weight. The brake assembly includes a clutch assembly to prevent vertical movement of the support mechanism when tension in the timing belt is reduced.

In addition, the spray bars include contact sensors in communication with the controller, such that if said contact sensors are touched by an object, the controller is able to move the carriage and the support mechanisms to a position prior to the object touching the contact sensors. This is accomplished by recording the movements of the carriage and support mechanisms and then replaying the recorded movements to a point prior to the contact.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 4a is an exploded view of the brake assembly;

FIG. 5b is a top section view of FIG. 5a;

FIG. 6 is a partial perspective view of the spray bar support mechanism and a perspective view of the sensor means;

FIG. 7a is a side sectional view illustrating the vertical pivoting movement of the spray bar;

FIG. 7b is a top sectional view illustrating the horizontal pivoting movement of the spray bar;

FIG. 8a is a perspective view illustrating the fluid distribution means when the spray bars are pivoting out of alignment;

FIGS. 9-14 illustrate the sequence of distributing fluid onto a vehicle by the present invention.

DETAILED DESCRIPTION OF THE INVENTION

Figure 1:
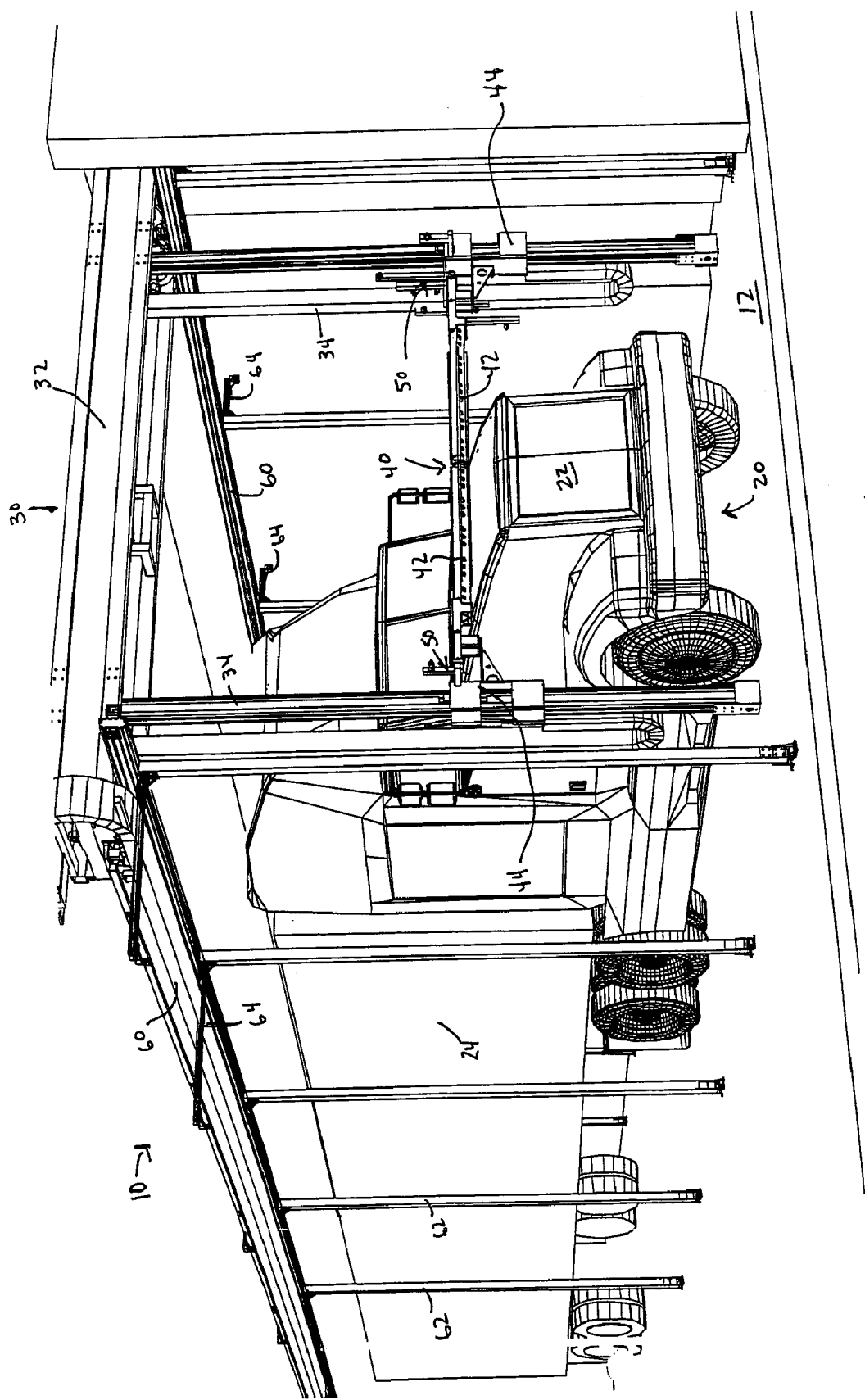
FIG. 1 is a perspective view of the vehicle cleaning system in accordance to the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

FIG. 1 illustrates a system 10 for cleaning a vehicle 20 in accordance with the present invention. The cleaning system 10 includes a carriage 30 that is suspended above the vehicle and moved horizontally in accordance with the length of the vehicle. Suspended from the carriage 30 is a fluid distribution mechanism 40, which is moved vertically in accordance to the vertical profile of the vehicle 20, such that the entire contour of the vehicle is closely followed. The contour of the vehicle 20 is determined simultaneously by a controller (not shown) during the cleaning process. The controller receives signals from sensor means 50 that detects the profiles of the vehicle. The controller then develops control signals representative of the contour of the vehicle 20 and controls the horizontal movement of the carriage 30 and the vertical movement of the fluid distribution mechanism 40 in concert such that all portions of the vehicle 20 are adequately cleaned.

The system 10 may be constructed to accommodate any sized vehicle 20, such as "normal sized vehicles" (including cars, vans, and sport utility vehicles) and "large sized vehicles" (including a truck, as illustrated, with such portions as a cab 22 and a trailer 24). Alternatively, the system 10 may be made to accommodate only normal sized vehicles, but, as described below, with the additional ability to clean vehicles with an attached trailers. In accordance with the present invention, the vehicle 20 is stationary during the cleaning process.

Continuing to refer to FIG. 1, the carriage 30 is placed on and moves horizontally along a pair of overhead tracks 60, which are supported by support beams 62 that are either secured to the floor or suspended from the ceiling of a vehicle washing bay 12. The overhead tracks 60 are spaced apart at a predetermined distance to accommodate the width of a vehicle. The overhead tracks 60 may also be secured to the wall of the washing bay 12 by anchored supports 64.

The fluid distribution means 40 is suspended from the carriage 30, by mounting a pair of horizontal spray bars 42 from columns 34 that extend downwardly from the carriage 30 substantially to the floor of the washing bay 12. The columns 34 are spaced apart such that a vehicle may travel unobstructively therebetween. Each spray bar 42 is secured to a support bar mechanism 44, which is moveably secured (in the vertical direction) to one of the columns 34, such that when the support bar mechanisms 44 are moved vertically, the spray bars 42 move therewith. The support bar mechanisms 44 are moved concurrently in order to move the spray bars 42 together along a single plane, and, as defined below, to maintain the sensor means's alignment during profiling of the vehicle. The spray bars 42 are also aligned end-to-end and extend across the washing bay 12, such that each spray bar covers half the distance between the columns 34. This alleviates unnecessary strain on the support bar mechanisms, as each support bar mechanism only supports half the total weight of the fluid distribution means 40, as opposed to having a single column extending from the carriage to support the entire weight of a single spray bar that extends above the entire width of the vehicle. This also permits additional features, mentioned hereinbelow, that have not been realized in the prior art.

Figure 2:
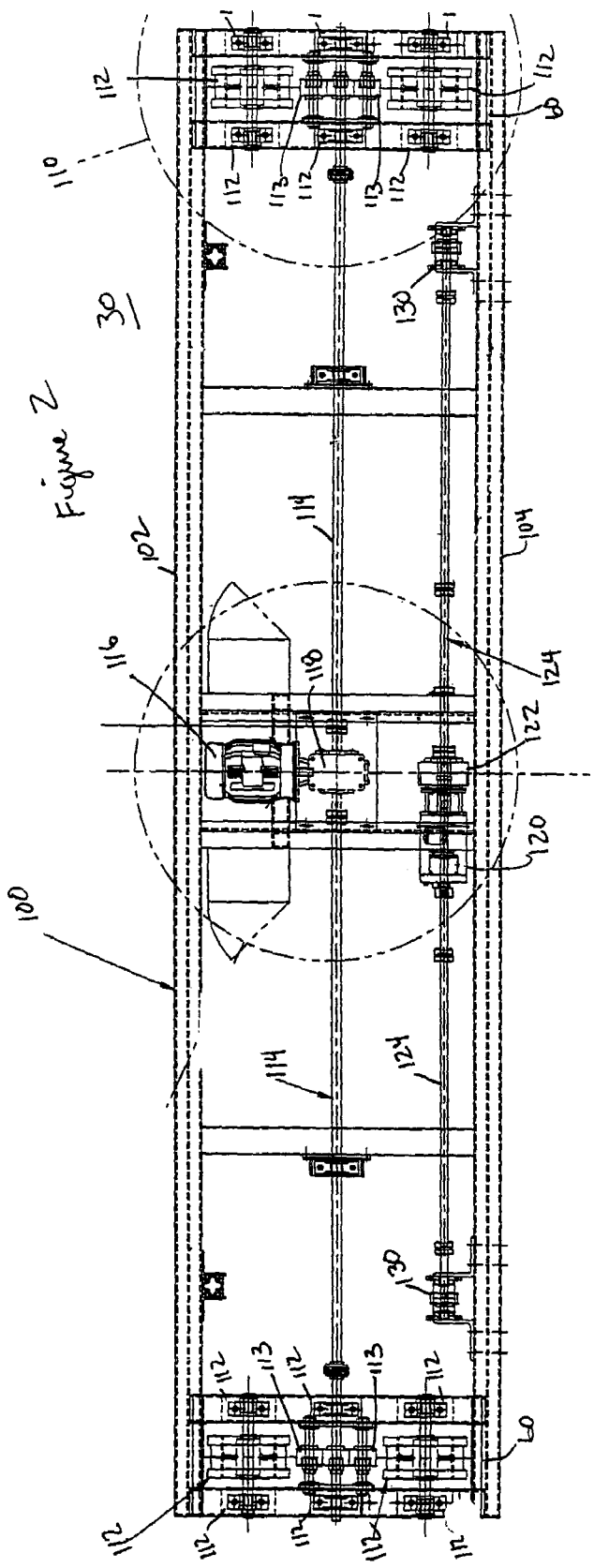
FIG. 2 is a top view of the movable carriage suspended above a vehicle and showing the motor mechanisms used to horizontally move the carriage and vertically move a fluid distribution mechanism.
Figure 3:
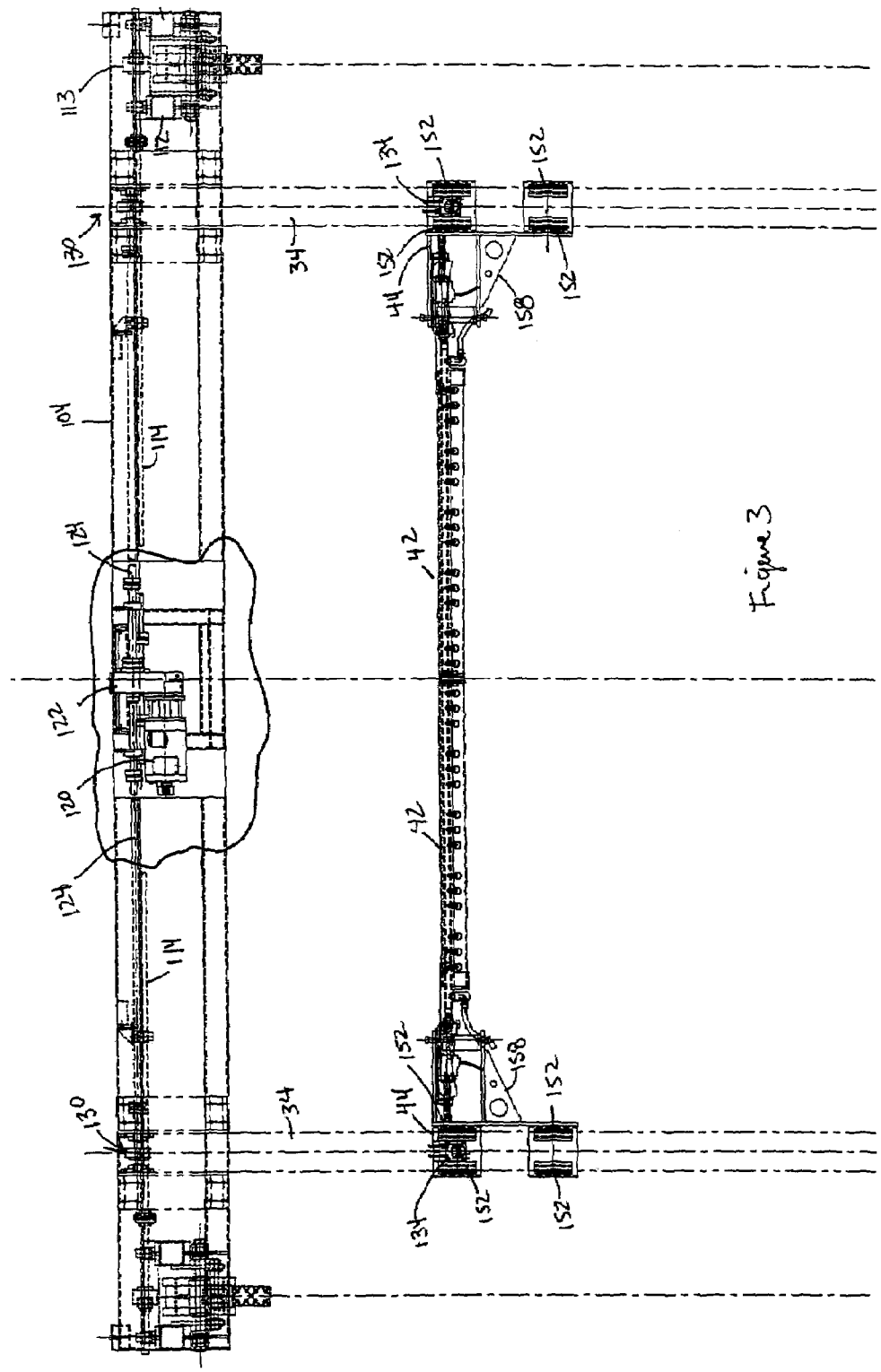
FIG. 3 is front section view of the cleaning system illustrating the carriage and the fluid distribution means suspended from the carriage.

Referring now to FIGS. 2-3, the carriage 30 is shown in greater detail. The carriage 30 includes a frame 100 with front and back walls 102 and 104. The frame 100 is mounted for horizontal movement on the overhead tracks 60 by means of a pair of roller mechanisms 110 that are separately secured to and interspaced between both ends of the walls 102 and 104. Each roller mechanism 110 includes a plurality of wheels 112 and idlers 113 connected by chains (not shown) and positioned on the overhead tracks 60. The wheels 112 rotate in direct response to the rotation of a first drive shaft 114 that is driven by first motor 116. The first motor 116 is meshed to a first gear box 118 that is rigidly connected to the first drive shaft 114, whereby when the first motor 116 is activated either in a forward or reverse direction, the carriage 30 is moved along the overhead tracks 60 in a corresponding direction.

The vertical movement of the spray bars 42 along the columns 34 is accomplished by a second motor 120, also mounted within the frame 110. Similarly connected, the second motor 120 is meshed to a second gear box 122 that is rigidly connected to a second drive shaft 124. The second drive shaft 124 drives a pair of pulley systems 130 that are separately mounted about the top portion of each column 34. Each pulley system 130 includes a timing belt 132 that is secured at one end to a brake assembly 134 defined in the support bar mechanisms 44 and another end secured to a counter weight 136 (the timing belt 132 and the counter weight 136 are illustrated in FIG. 5b). When the second drive shaft 124 rotates the pulley systems 130, the counter weights 136 move upwardly and downwardly in direct response thereto and as such move the support bar mechanisms 44 vertically via their corresponding timing belts 132.

Figure 4B:
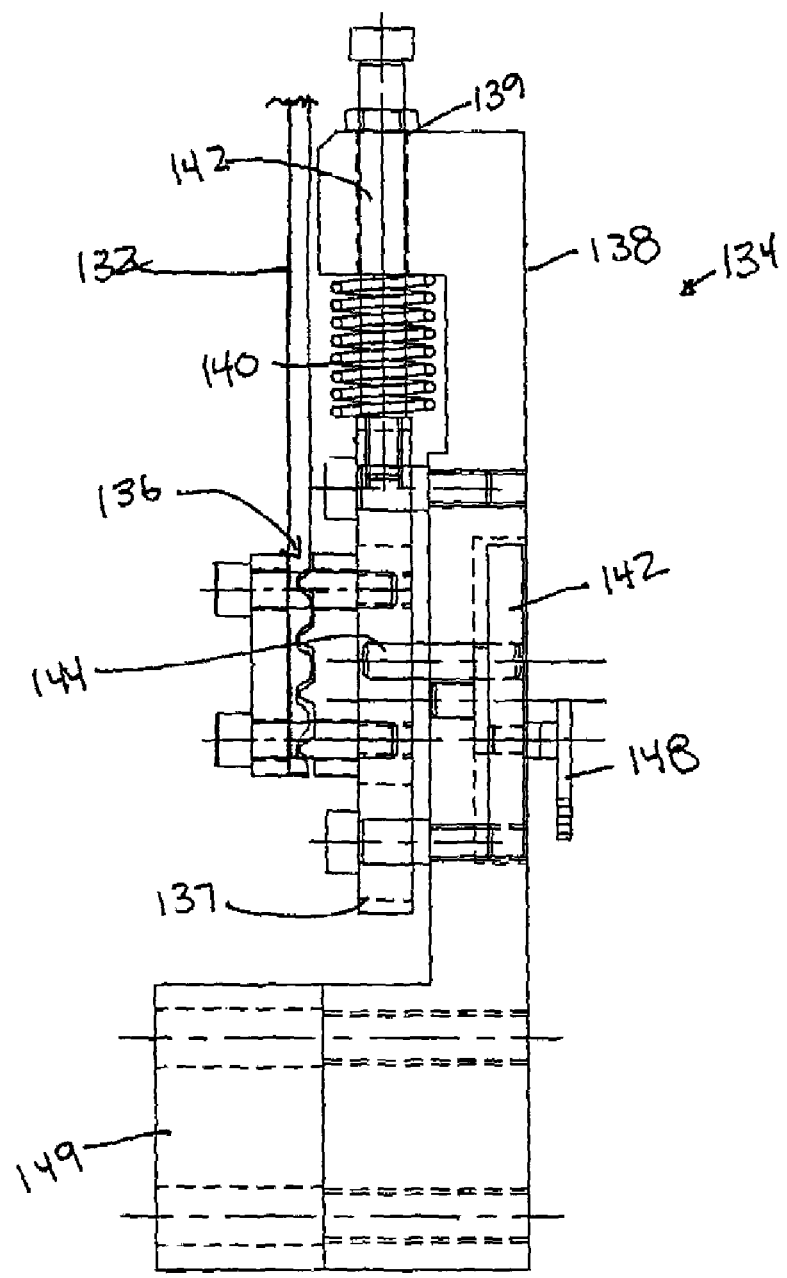
FIG. 4b is a side cross-sectional view of the brake assembly from FIG. 4 when assembled.

Referring now to FIGS. 4a-4b, the brake assembly 134 that is positioned in each support bar mechanism 44 is illustrated. The brake assembly 134 includes a main body 138 that clamps the timing belt 132 to a slide plate 137 via a clamping assembly 136. The main body 138 and the slide plate 137 include openings 139 on the top sides thereof that, when assembled, align to receive compression springs 140 and shoulder bolts 142. Attached to the backside of the main body 138 is a catch assembly 144 that rides in a slot (not shown) in the vertical columns 34. The catch assembly 144 includes a pin 146 that fits in an aperture on the slide plate 137. When the tension of the timing belt 132 is broken, the compression springs 140 actuate the slide plate 137, which further actuates the pin 146 such that the catch assembly 144 rotates causing a catch 148 on its backside to lock in the slot of the vertical column 34, preventing the support bar mechanism 44 from moving in a downwardly direction. The brake assembly 134 also includes a spacer block 149 fitted against the main body 138.

Figure 5A:
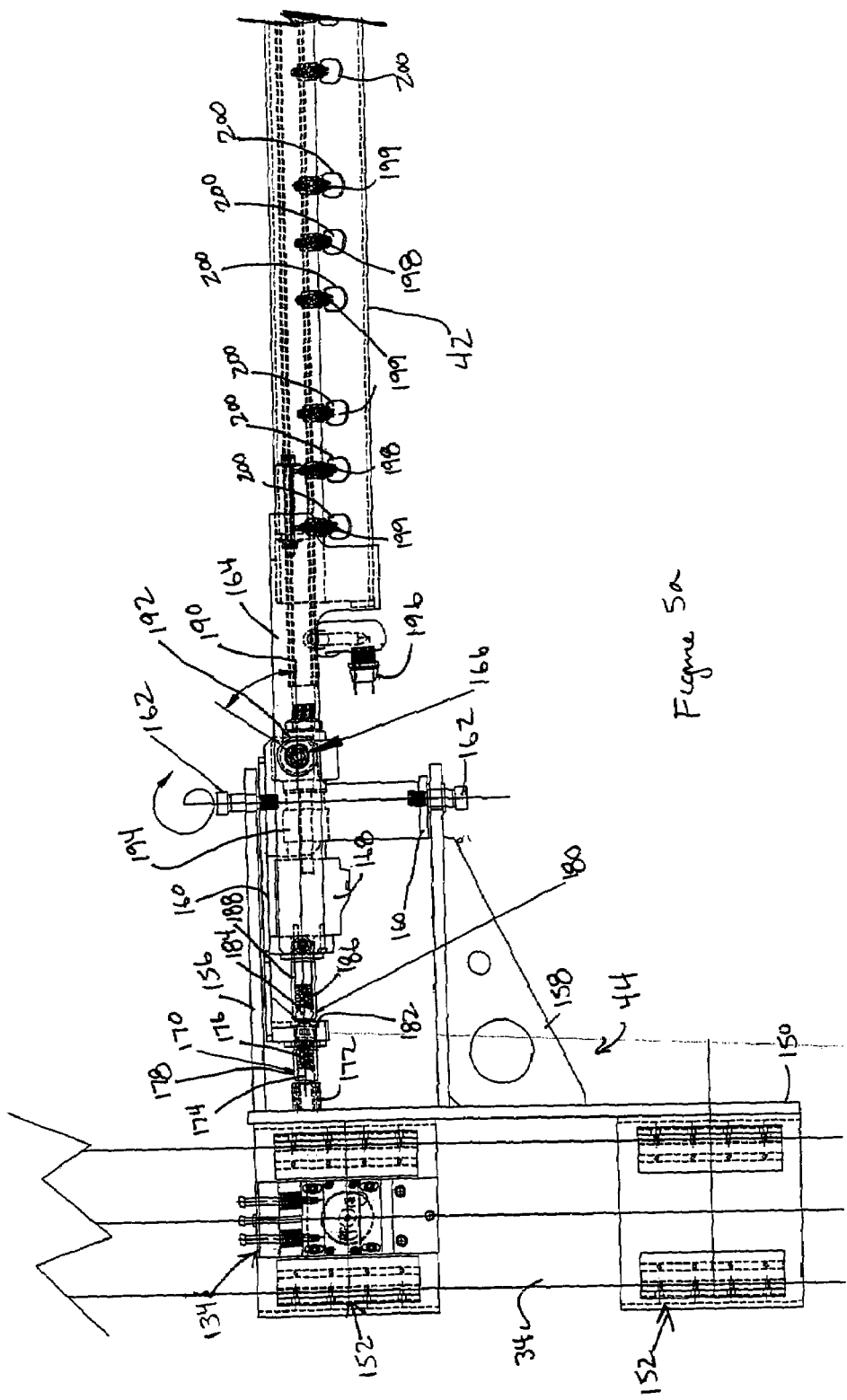
FIG. 5a is a side sectional view of the spray bar support mechanism and a partial view of the spray arm.
Figure 5B:
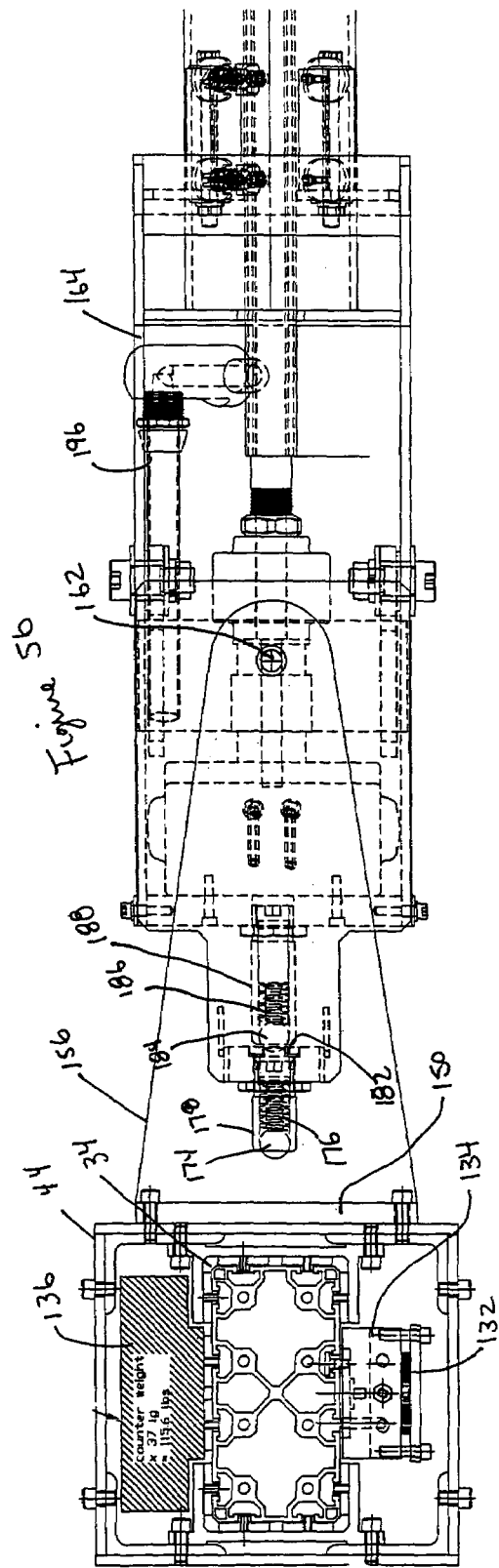

Referring now to FIGS. 5a-7b, the support bar mechanism 44 includes a column mount 150 that secures the spray bar 42 to the vertically suspended column 34. The two column mounts 150 house bearing-blocks 152 and other safety features, including the aforementioned brake system 134. Another safety feature, provided by the column mounts 150, permits each spray bar 42 to freely pivot horizontally and/or vertically, independently of the other spray bar if the spray bars are accidentally hit by the vehicle 20. As shown in FIGS. 5a-6, the column mount 150 is secured to a primary mount 156 that includes a support bracket 158 that helps support the weight of the spray bar 42. A transition bracket 160 is pivotally mounted to the primary mount 156 about a first pivot 162, which permits the transition bracket 160 to horizontally pivot about the primary mount 156 at the first pivot 162. Further mounted to the transition bracket 160 is a secondary mount 164, mounted at a second pivot 166 that permits the secondary mount 164 to vertically pivot about the transition bracket 160. Preferably, the first pivot 162 and the second pivot 166 are perpendicular, however, the bi-directional pivoting may be designed for pivoting in any given two planes.

To prevent the primary mount 156 and the secondary mount 164 to freely pivot during normal operation of the spray bars 42, a means for resisting the horizontal and vertical pivoting of the spray arm is employed. To prevent horizontal pivoting, a primary spring loaded ball and socket system 170 is provided between the primary mount 156 and the transition bracket 160. The primary spring loaded ball and socket system 170 includes a primary detent 172 secured to the primary mount 156 and a primary ball 174 that is positioned and kept loaded into the primary detent by a primary spring 176 that is maintained in a primary tube 178 on the transition bracket 160. Similarly, to prevent vertical pivoting, a secondary spring loaded ball and socket system 180 is provided between the transition bracket 160 and the secondary mount 164. The secondary spring loaded ball and socket system 180 includes a secondary detent 182 secured to the transition bracket 160 and a secondary ball 184 that is positioned and kept loaded in the secondary detent by a secondary spring 186 that is maintained in a secondary tube 188 on the secondary mount 164. The separate vertical and horizontal pivoting of a spray arm is illustrated in FIGS. 7a and 7b respectively.

Referring now to FIGS. 6 and 8a, the sensing means 50 is illustrated. As illustrated more clearly in FIG. 8a, the sensing means 50 includes a plurality of sensor pairs supported by the support bar mechanisms 44. Each sensor 52a, 52b . . . 52n that is supported on a support bar mechanisms 44 has a corresponding aligned sensor 53a, 53b . . . 53n on the other support bar mechanism. It is thus important, as mentioned above, that the support bar mechanisms 44 are moved in concert such that the sensors are kept in alignment. As the vehicle 20 is moved through the washing system, the sensors are continuously being activated (i.e., broken) by the vehicle, which indicates to the controller to move the spray bars and re-establish the sensing connection, which thereby moves the spray bars to follow the vehicle's profile (discussed in greater detail below).

Figure 8B:
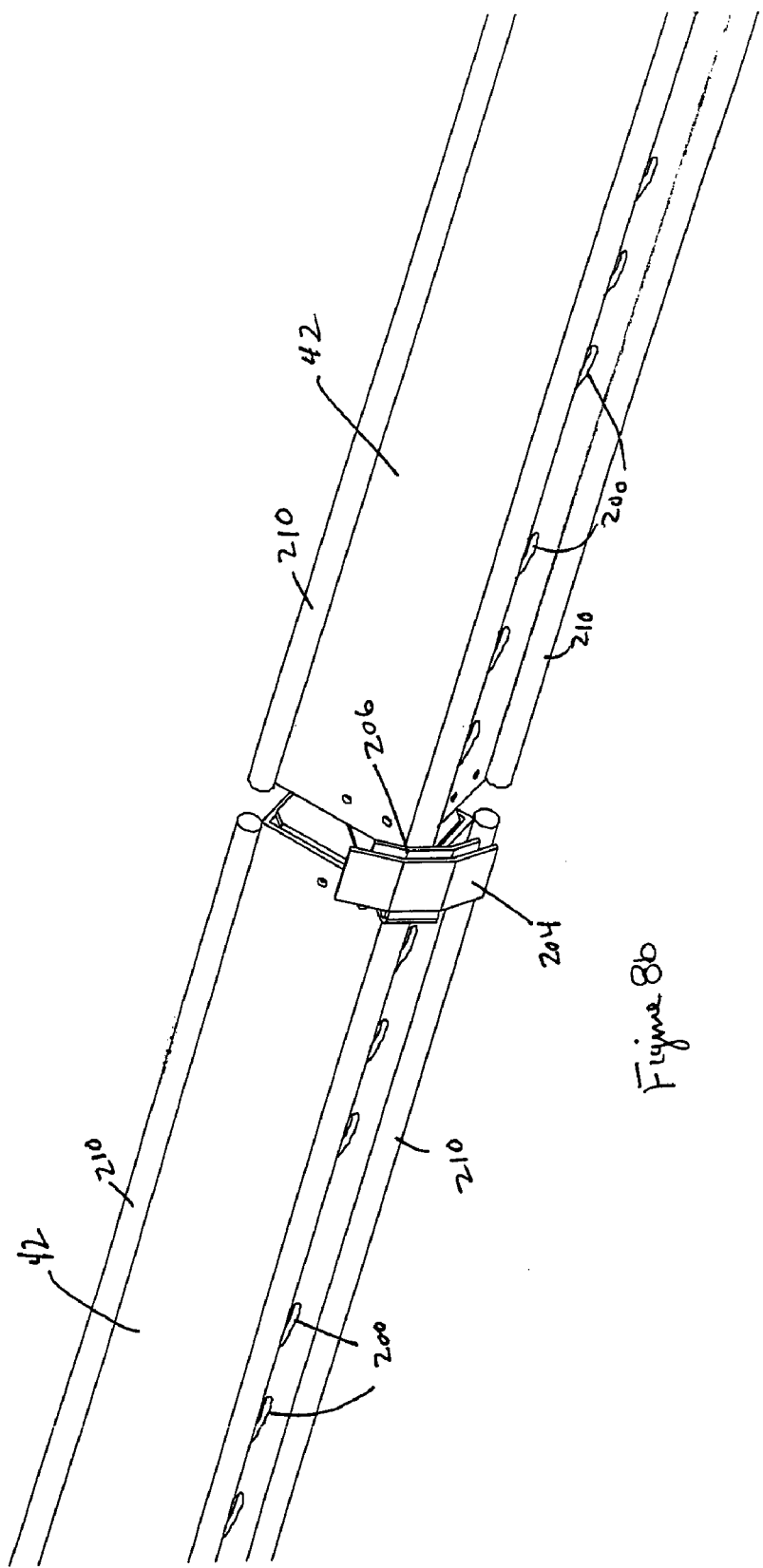
FIG. 8b is a enlarged perspective view illustrating the magnetic alignment means used to keep the ends of the spray bars aligned with each other.
Figure 12:
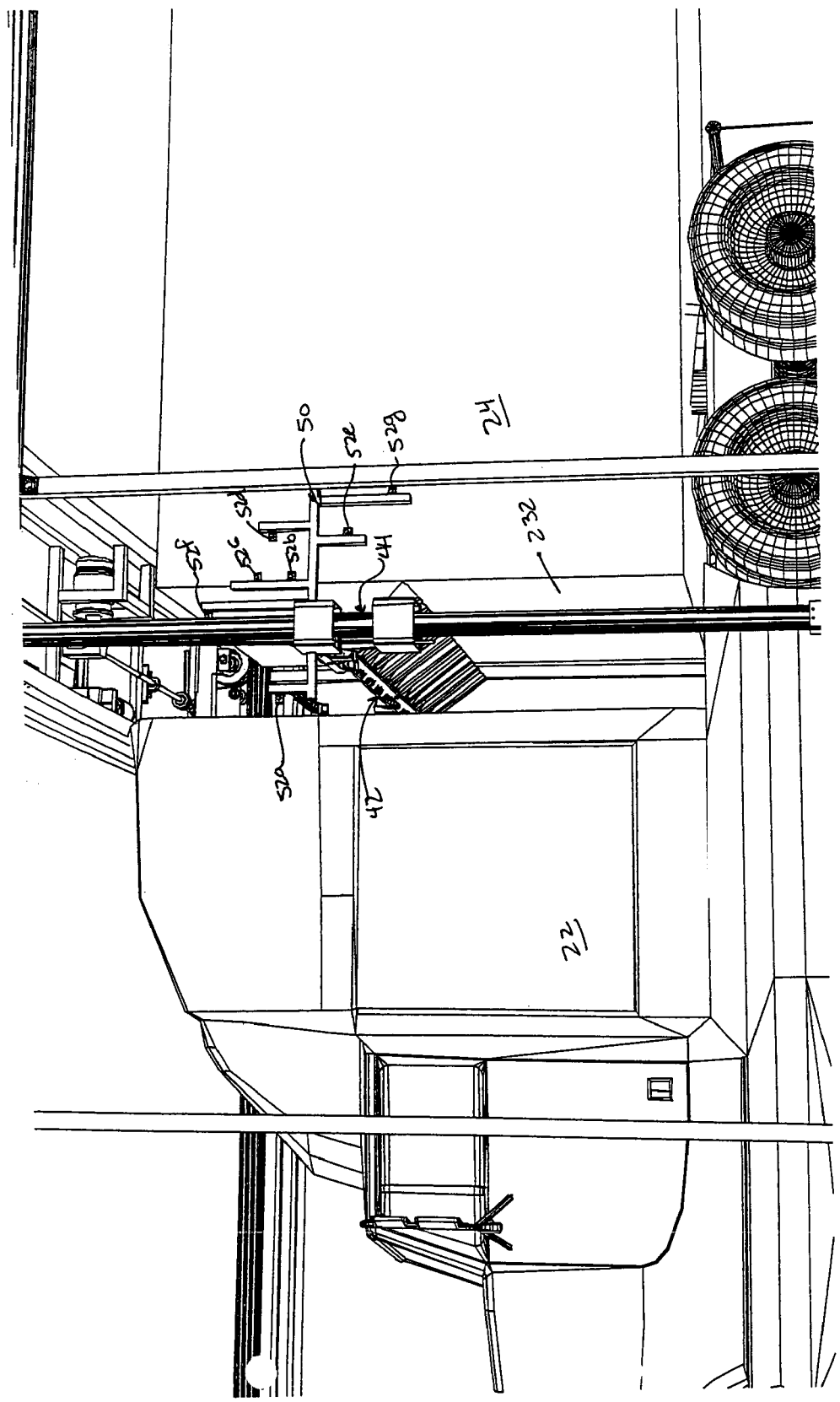
Figure 13:
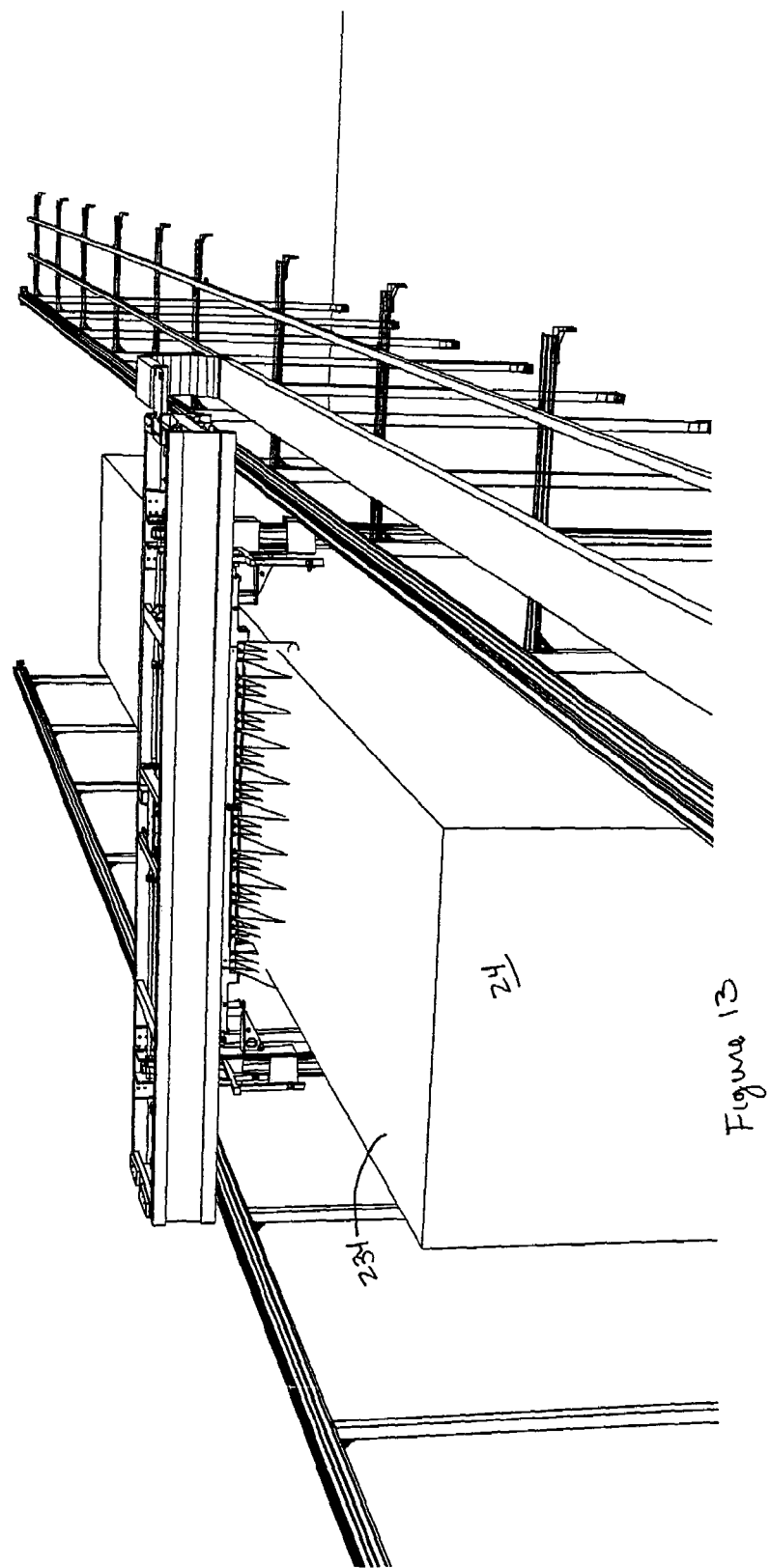

Referring now to FIGS. 8a and 8b, while the primary and/or secondary spring load ball and socket systems 170 and 180 help keep the spray arms 42 from pivoting horizontally and vertically, the present invention also includes a means for magnetically aligning the spray arms 42 at ends distal to the support bar mechanisms 44. The magnetically aligning means 202 includes a pair of plates 204/206, preferably made from a magnetic grade of stainless steal, attached to the distal end of each spray arm 42. Attached to one of the plates is a rare earth metallic plate 208, providing the ability for the two plates 204/206 to always attract each other such that when the two spray arms 42 are aligned, the plates 204/206 overlap and secure against each other to hold the ends of the spray arms 42 substantially in the same plane (best shown in FIG. 8b).

Another safety feature provided by the present invention includes the placement of a plurality of contact sensors 210 about the spray arm 42. The contact sensors 210 are in communication with the controller such that if the contact sensors 210 are touched by the vehicle 20, the controller will receive a signal from the contact sensors 210 and retract the spray arms 42 to the top of the columns 34. Alternatively, the spray arms 42 may be moved to a position prior to impact, this may be accomplished by having the controller record the movements and profiles of the vehicle and then replaying the movements in reverse order. If done efficiently, the spray arms 42 may be moved prior to a forcible impact that breaks the primary and/or secondary spring load ball and socket systems 170 and 180. Since, once the vertical or horizontal pivoting resistance defined by a spring load ball and socket system is released, the systems 170 and 180 must be manually reset into their respective detents.

During operation, the spray arms 42 rotate or pivot about there own axis such that the discharged fluid is directed towards the surface of the vehicle 20 at an optimal angle. The spray arms 42 are therefore pivotally secured to the transition bracket, via a rotary actuator 168, shown in FIG. 5*a*. The rotation is controlled by the controller in accordance to the sensor means 50 and the detected profile of the vehicle 20. Each spray arm 42 includes an internal spray tube 190 that is secured to a spray manifold 192. The spray manifold 192 has a high-pressure coupler 194 through which high-pressurized liquids from an external hose (not shown) are feed through the spray tube 190. Low pressurized liquids are feed through a separate hose 196 that is separately attached to the spray tube 190. Preferably, the spray tube 190 is double walled such that the low and high-pressurized liquids flow through separate compartments. The spray tube 190 also includes a plurality of nozzle adapters 196 positioned along the spray tube 190. The nozzle adapters 196 either receive a low-pressure nozzle 198 in fluid communication with the portion of the spray tube delivering low-pressure liquids or receive a high-pressure nozzle 199 in fluid communication with the portion of the spray tube delivering high-pressure liquids. The fluid is jetted through apertures 200 in the spray arm 42 onto the surface of the vehicle 20.

One important aspect of the present invention, not found in the prior art, is that when the vehicle 20 is a truck or includes a trailer, the fluid distribution mechanism 40 is controlled such that the entire vehicle is adequately cleaned, such as, but not limited to, the front end of the truck (grill, hood, windshield, and smoke stack) between the cab/car and attached trailer, between trailers, and the rear end of the vehicle or trailer. Referring now also to FIGS. 9-17, as the vehicle 20 is driven into the washing bay 12, the vehicle may drive over sensor plates in the washing bay floor, to indicate to the cleaning system 10 that a vehicle as entered the system. The vehicle 20 pulls up to the front of the system, which may be indicated by a visual display that directs the vehicle to drive up and then stop at a specific location. While the vehicle 20 is driving through the front of the system 10 the undercarriage of the vehicle 20 may be sprayed and washed by a conventional undercarriage washing units, well known in the art.

Once the vehicle 20 is in position, the controller will lower the fluid distribution mechanism 40 to the lower front end of the vehicle 20. The position of the lower front end of the vehicle will be sensed by the plurality of sensors 52. Moreover, the spray bars 42 will be pivoted to direct the nozzles towards the surface of the vehicle (again detectable by the sensors 52). Throughout this process, the controller through the sensing means 50 is continuously pivoting the spray bars 42 and moving the fluid distribution mechanism such that the spray of the fluid is at a substantial optimum angle towards the surface of the vehicle 20 and substantial optimum distance away from the surface of the vehicle 20.

Figure 14:
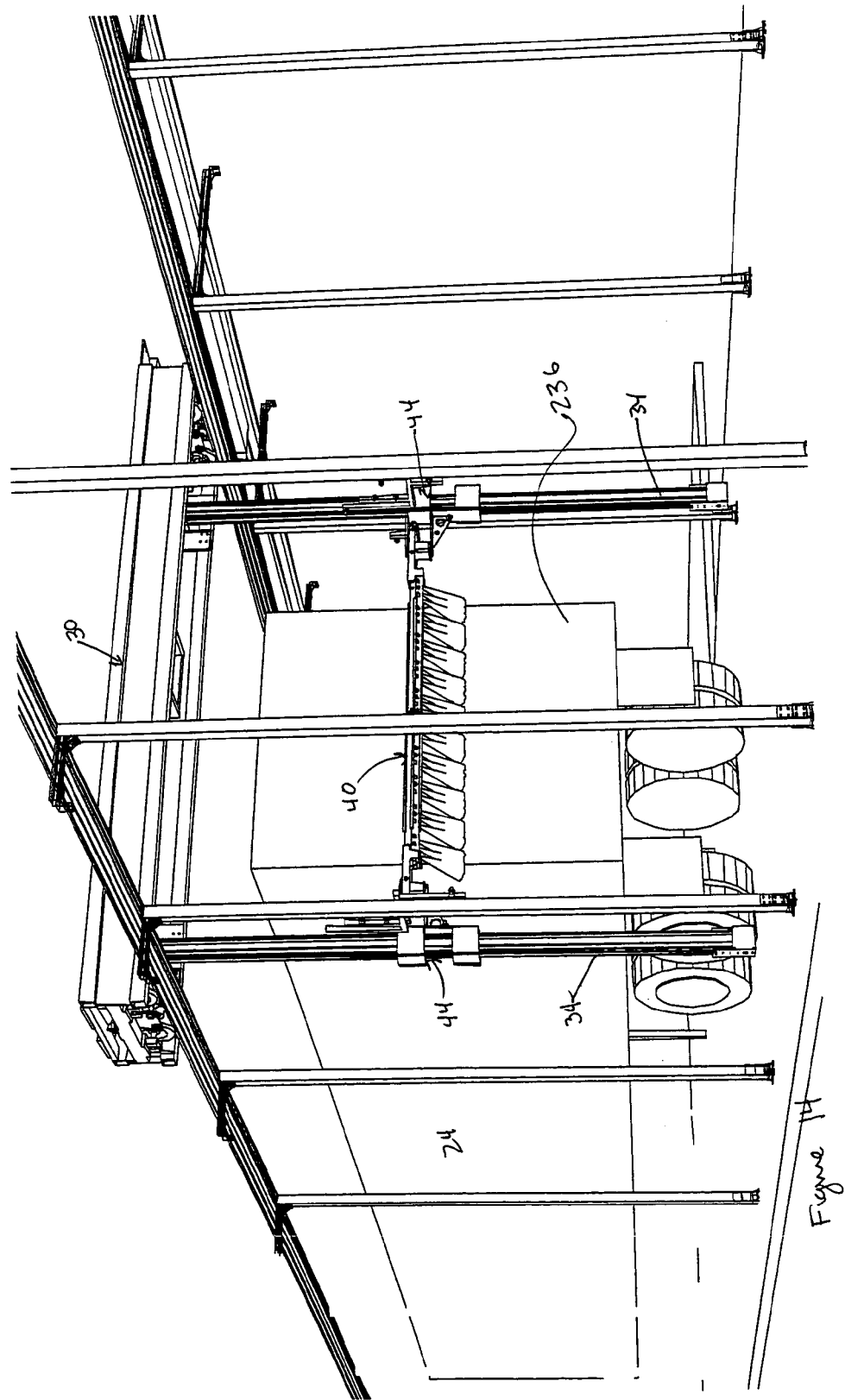

Once the fluid distribution mechanism 40 is in its initial position, a low pressurized cleaning fluid will begin discharging from the low-pressure nozzles 198 (FIG. 9), referred to herein as the initial cleaning cycle. The carriage 30 and the fluid distribution mechanism 40 will then begin to move in response to the controller and the developing control signals that are indicative of the horizontal and vertical profiles of the vehicle. During the process, illustrated from FIG. 9 to FIG. 10, the fluid distribution mechanism 40 is moving and spraying low pressurized cleaning fluid on the vehicle's bumper 220, grill 222, hood 224, windshield 226, and wind deflector 228. Upon reaching the gap between the cab 22 and the trailer 24, the controller detecting the gap from the various pairs of sensors 52 is able to direct the fluid distribution mechanism 40 down the backside 230 of the cab 22 and then up the front side 232 of the trailer 24 (illustrated in FIGS. 11 and 12). The ability to successfully wash between the cab and the trailer has not been realized in the prior art, and is believed to be a substantial improvement over the prior art. Continuing the cleaning process, the spray bars 42 are moved along the topside 234 of the trailer 24 (FIG. 13) and them down the backside 236 of the trailer 24 (FIG. 14). It is further contemplated, that provided with a longer washing bay, the present invention is capable of washing a between a first and second trailer. When the sensor means 50 indicates to the controller that a second trailer is not present, the controller may move the distribution means 40 to the bottom of the columns 34 to begin a rinsing cycle of high-pressurized water. The detection of a second trailer or even the detection of the first trailer may also be accomplished by using a stationary sensor able to detect gaps between trailers and a vehicle with attached trailer. This is them processed by the controller for properly moving the horizontal carriage and vertical support mechanisms.

It is also important to note, that during the aforementioned initial cleaning cycle and the rinsing cycle, described below, the sides of the vehicle 20 are also being cleaned and rinsed by attaching spray bars (not shown) vertically to the columns 34.

The beginning of the rinsing cycle causing the reverse movement of the fluid distribution means and pivoting of the spray bars to completely rinse the surfaces of the vehicle 20. This may be accomplished by using the sensor means 50 to re-detect the surface of the vehicle. The high pressurized rinsing cycle, however, creates a large amount of misting that may effect the sensor means 50; as such, the controller includes a data recording means (not shown) to record the profiles of the vehicle and/or movement of the fluid distribution means and rotation of the spray bars. The controller, therefore, is able to control the fluid distribution means and rotation of the spray bars in accordance to the recorded data. Moreover, when the controller includes a data recording means, the controller is able to halt the system at any time due to problems (such as being caught under on an overhang) and reverse the movement of the fluid distribution means to a position prior to the problems.

Figure 15:
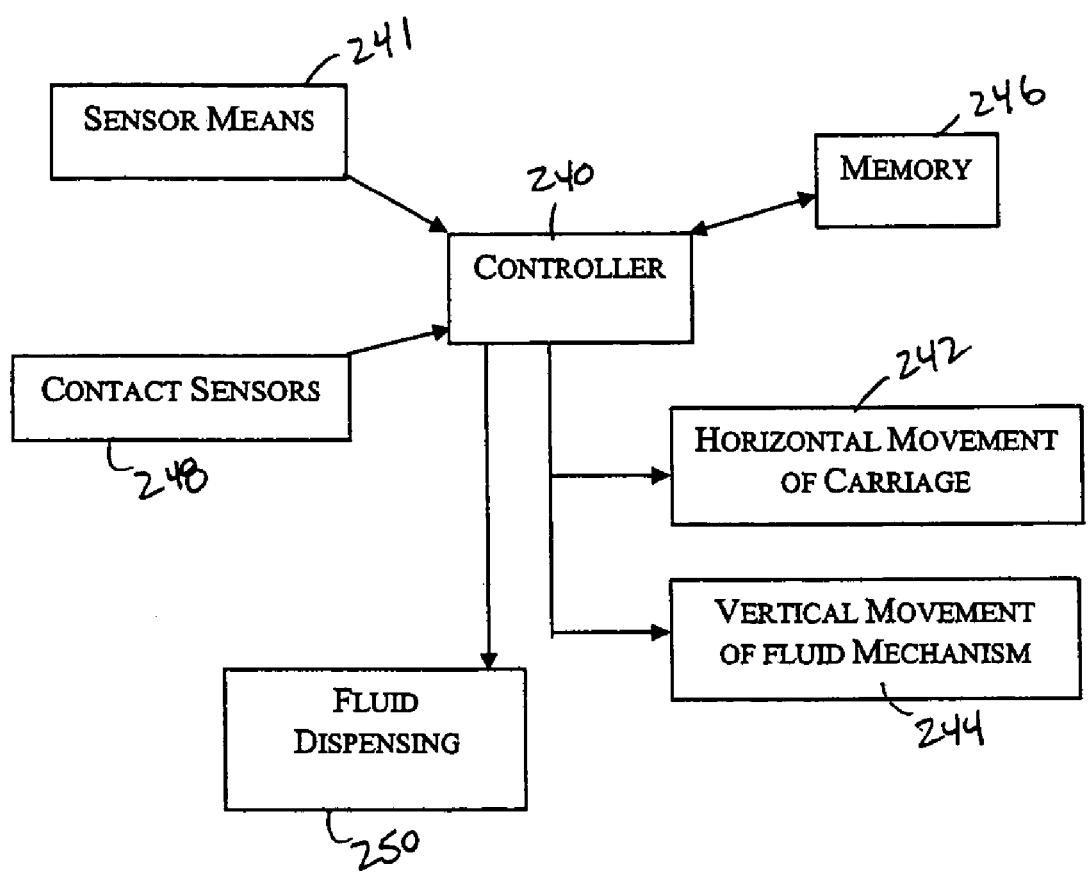
FIG. 15 is a system block diagram illustrating the communication between the controller and the other functional units of the system.

Referring now to FIG. 15, a block diagram of the system is shown, the controller 240 is in contact with the sensor means 241 to develop the profiles of the vehicle 20. The controller 240 controls the horizontal movement of the carriage 242 and the vertical movement of the fluid mechanism 244 in direct response to the profiles. Moreover, the control signals used to move the carriage and fluid mechanism may be recorded for later use in a memory storage unit 246. Lastly, the controller 240 is in communication with the contact sensors 248 and the system for dispensing the fluid 250.

It should be further stated the specific information shown in the drawings but not specifically mentioned above may be ascertained and read into the specification by virtue of a simple study of the drawings. Moreover, the invention is also not necessary limited by the drawings or the specification as structural and functional equivalents may be contemplated and incorporated into the invention without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A system for cleaning a stationary vehicle defined as including a trailer attached thereto, the system comprising:
    a horizontally movable carriage suspended above said stationary vehicle;
    a verticaUy movable fluid distribution mechanism suspended from said horizontally movable carriage, with said fluid distribution system comprising a pair of horizontally positioned spray bars having a capability to discharge a fluid, each spray bar having an end rotatably secured to a support bar mechanism, each support bar mechanism being vertically movable and suspended from said carriage, and with the pair of spray bars further having ends distal to said support bar mechanism that are adjacent to each other, and wherein the end distal to the support bar mechanism include a means to magnetically align the end to each other;
    a plurality of sensors secured to said fluid distribution mechanism for detecting a profile of the vehicle and the trailer attached thereto; and
    a controller in communication with the plurality of sensors and having a means to control the movement of the carriage and the fluid distribution mechanism in response to the profile of the stationary vehicle and the trailer attached thereto such that the controller is capable of moving the fluid distribution mechanism to clean the stationary vehicle and the trailer attached thereto including the capability of moving the fluid distribution mechanism in-between the stationary vehicle and trailer of said stationary vehicle to effectively clean surfaces relating thereto.

2. The system of claim 1, wherein the fluid distribution mechanism is suspended and attached to the horizontally movable carriage through a dual-pivotal connection permitting the fluid distribution mechanism to pivot independently from the horizontally movable carriage in at least two planes, each pivotal connection further includes a means to resist pivoting.

3. The system of claim 2, wherein each means to resist pivoting is a spring loaded ball and socket system.

4. The system of claim 2, wherein the two support bar mechanisms are vertically movable by a pulley system having a motor mechanism rotatably driving an axle separately secured to a pair of timing belts, each timing belt having one end secured to a brake assembly attached to one of the support bar mechanisms and another end secured to a counter weight; the brake assembly having the means to prevent vertical movement of the support bar mechanism when tension in the timing belt is reduced.

5. The system of claim 1, wherein each spray bar includes a double-walled internal tube having attached thereto a plurality of nozzles to discharge low-pressure and high-pressure fluids.

6. The system of claim 1 further comprising contact sensors positioned along fluid distribution mechanism and in communication with the controller, wherein in response to said contact sensors being touched by an object, the controller is adapted to move the carnage and the fluid distribution mechanism to a position prior to the object touching the contact sensors.

7. A vehicle cleaning system comprising:
    a pair of horizontally moveable columns diametrically opposed and having an area in between said columns to accommodate a vehicle;
    a vertically moveably support mechanism attached to each column;
    a pair of horizontal spray bars for dispensing liquids, the spray bars separately attached to one of the support mechanisms, each spray bar comprising a double-walled tube coupled to a plurality of nozzles to separately contain and discharge a first fluid and a second fluid;
    a plurality of sensors secured to said support mechanisms for detecting a profile of a stationary vehicle positioned between said columns;
    a data recorder, in communication with said plurality of sensors, for recording said vehicle profile; and
    a controller in communication with the plurality of sensors and with the data recorder, and with said controller adapted to control the horizontal movement of the columns and the vertical movement of the support mechanisms in real time as the vehicle profile is detected and subsequently in response to the recorded profile of the vehicle.

8. The cleaning system of claim 7, wherein each support mechanism includes a primary mount moveably secured to a column, a transition mount pivotally connected to the primary mount about a first pivot direction, a secondary mount pivotally connected to the transition mount about a second pivot direction, the spray bar further being rotatably connected to the secondary mount, and separate means for resisting pivoting in said first and second pivot directions until said spray bar makes contact with an object sufficient enough to overcome said resisting means.

9. The cleaning system of claim 8, wherein the first pivot and the second pivot directions are perpendicular to each other.

10. The cleaning system of claim 8, wherein the means for resisting the pivotal movement is defined by having a spring loaded ball and socket system between the primary mount and the transition mount to resist pivoting in first direction and having a spring loaded ball and socket system between the transition mount and the secondary mount to resist pivoting in the second direction.

11. The system of claim 7, wherein the two support mechanisms are vertically movably by a pulley system having a motor mechanism rotatably driving an axle separately secured to a pair of timing belts, each timing belt having one end secured to a brake assembly attached to one of the support mechanisms and another end secured to a counter weight; the brake assembly having the means to prevent vertical movement of the support mechanism when tension in the timing belt is reduced.

12. The system of claim 7, further comprising contact sensors positioned along spray bars and in communication with the controller, such that if said contact sensors are touched by an object, the controller is able to control the horizontal movement of the columns and the vertical movement of the support mechanisms to a position prior to the object touching die contact sensors.

13. A method for operating the system of claim 7, comprising the steps of:
applying the first fluid onto the vehicle in real time substantially during the detection of the vehicle profile by the system; and
applying the second fluid onto the vehicle substantially during the use of the recorded profile of the vehicle by the system.

14. A method for operating the system of claim 13, wherein said first fluid is applied at a first pressure, with said second fluid being applied at a second pressure, the second pressure higher than the first pressure.

15. A method for operating the system of claim 13, wherein said first fluid and said second fluid are applied by spraying.

16. The system of claim 7, wherein each spray bar is further adapted to separately discharge a first fluid at a first pressure and a second fluid at a second, higher pressure.

17. A vehicle cleaning system comprising:
a horizontally movable carriage suspended above said vehicle;
a pair of columns suspended from said carriage and diametrically opposed to define an area in between said columns to accommodate a vehicle;
a vertically moveably support mechanism attached to each column;
a pair of horizontal spray bars for dispensing liquids, the spray bars separately including one end attached at a dual-pivotal connection to one of the support mechanisms and another end distal to said dual-pivotal connection that is detachably aligned with the other distal end of the other spray bar;
a plurality of sensors secured to said fluid distribution mechanisms for detecting a profile of a vehicle positioned between said columns; and
a controller in communication with the plurality of sensors and having a means to control the movement of the carriage and the movement of the support mechanisms in response to the profile of the vehicle, wherein each support mechanism includes a primary mount moveably secured to a column, a transition mount pivotally connected to the primary mount about a first pivot direction, a secondary mount pivotally connected to the transition mount about a second pivot direction that is perpendicular to the first pivot direction, the spray bar further being rotatably connected to the secondary mount, and separate means for resisting pivoting in said first and second pivot directions until said spray bar makes contact with an object sufficient enough to overcome said resisting means.

18. The cleaning system of claim 17, wherein the means for resisting the pivotal movement is defined by having a spring loaded ball and socket system between the primary mount and the transition mount to resist pivoting in first direction and having a spring loaded ball and socket system between the transition mount and the secondary mount to resist pivoting in the second direction.

19. The system of claim 18, wherein the two support mechanisms are vertically movably by a pulley system having a motor mechanism rotatably driving an axle separately secured to a pair of timing belts, each timing belt having one end secured to a brake assembly attached to one of the support mechanisms and another end secured to a counter weight; the brake assembly having the means to prevent vertical movement of the support mechanism when tension in the timing belt is reduced.

20. The system of claim 17 further composing contact sensors positioned along spray bars and in communication with the controller, such that if said contact sensors are touched by an object, the controller is able to control the horizontal movement of the columns and the vertical movement of the support mechanisms to a position prior to the object touching the contact sensors.

* * * * *